United States Patent [19]

Hallden-Abberton et al.

[11] Patent Number: 4,874,824

[45] Date of Patent: Oct. 17, 1989

[54] PROCESS FOR MANUFACTURING LOW-ACID, GLUTARIC-ANHYDRIDE-CONTAINING COPOLYMERS

[75] Inventors: Michael P. Hallden-Abberton, Maple Glen; Leslie A. Cohen, Langhorne, Pa.; Robert S. Wood, Holland, all of Pa.

[73] Assignee: Rohm and Haas Company, Philadelphia, Pa.

[21] Appl. No.: 123,683

[22] Filed: Nov. 23, 1987

[51] Int. Cl.$^4$ ................................................ C08F 8/00
[52] U.S. Cl. .................................. 525/379; 525/330.5
[58] Field of Search ............................. 525/330.5, 379

[56] References Cited

U.S. PATENT DOCUMENTS 4,246,374 1/1981 Kopchick .......................... 525/330.5
4,604,221 8/1986 Bryant et al. ..................... 525/330.5

Primary Examiner—Joseph L. Schofer
Assistant Examiner—Bernard Lipman
Attorney, Agent, or Firm—John E. Taylor, III; Terence P. Strobaugh

[57] ABSTRACT

Thermoplastic copolymers of glytaric anhydride and (meth)acrylic esters may be prepared free of acid groups by reacting a (meth)acrylic ester polymer with a secondary amine at elevated temperature, and subsequently removing volatile components from the polymer at elevated temperature and reduced pressure.

19 Claims, No Drawings

PROCESS FOR MANUFACTURING LOW-ACID, GLUTARIC-ANHYDRIDE-CONTAINING COPOLYMERS

This invention relates to a process for making thermoplastic copolymers, and more particularly thermoplastic copolymers of acrylic esters with qlutaric anhydrides.

BACKGROUND OF THE INVENTION

Anhydrides of carboxylic acids have the general formula:

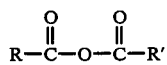

where R and R' may be the same or different organic groups. They may be made by several processes including the reaction of carboxylic acids or their salts with strong dehydrating agents, as for example phosphorus oxychloride or anhydrides of other carboxylic acids. Polyermic anhydrides, particularly polymeric anhydrides of alpha-beta-unsaturated monocarboxylic acid polymers, may be made according to the process of Jones, U.S. Pat. No. 3,137,660, by treating polymers of the monocarboxylic acid with such strong dehydrating agents. The resulting polymers contain both acid and anhydride groups attached to the polymer backbone, and have very low decomposition temperatures.

Further, the Jones process is not suited to the preparation of copolymers from ester monomers with anhydride monomers, since the use of such comonomer mixtures as, for example, methyl methacrylate with methacrylic acids leads to insoluble (crosslinked) polymers. Polymeric anhydrides which are essentially free of acid and inorganic contaminants, and which have high thermal decomposition temperatures may be made according to the process of Kopchik, European Patent Publication No. 76691, by treating polymers containing the monocarboxylic acid groups in a reaction vessel under devolatilization conditions.

Other processes for making polymeric glutaric anhydrides by cyclizing adjacent, pendant acid groups include Tsunoda et al., Japanese Kokai 60/231756, Kato et al., Japanese Kokai 61/254608, and Otani et al., Japanese Kokai 61/43604; the last employing low levels of ammonia or an amine to catalyze the cyclization of the acid groups into anhydrides and/or imides. Sasaki et al., in Japanese Kokai 60/184505 discloses cyclization of adjacent t-butyl (meth)acrylate mers in a polymer by heating them to liberate isobutylene; in this thermal process isobutylene is liberated from non-adjacent mers as well, to leave pendant, free acid groups in the low-molecular-weight, crystalline polymer.

The above processes require the presence of the monocarboxylic acid in the precursor feedstock in order to form anhydride, or create carboxylic acid in the anhydride polymer. An object of the present invention is to provide a process which does not require such a monocarboxylic acid in the precursor feedstock, or introduce acid into the resulting polymer. A further object is to present a process which may be used to prepare amorphous copolymers of, for example, acrylic or methacrylic esters and their corresponding anhydride essentially free of monocarboxylic acid and inorganic contaminants, yet which, depending upon the degree of reaction chosen, the feedstock acrylic polymer, the type of amine used, and process conditions, may also be used to prepare such amorphous copolymers containing monocarboxylic acid and/or amide functionality, as well, starting with a feedstock polymer that contains no acid or amide functionality.

Yet another object of the present invention is to produce polymers which are soluble, non-crosslinked, and possess high glass-transition temperatures and thermal-decomposition temperatures, and to produce all-acrylic polymers possessing such properties. Other objects of the invention will be apparent from the discussion below.

THE INVENTION

We have discovered a process for the preparation of thermoplastic copolymers of glutaric anhydride and (meth)acrylic esters by which the product polymer may be prepared essentially free of acid groups, or alternatively may, by proper selection of reactants and conditions, be prepared to contain acid and amide groups, which process comprises reacting an acrylic ester polymer with a secondary amine under conditions of elevated temperatures, and subsequently isolating the polymer.

DETAILED DESCRIPTION OF THE INVENTION

The acrylic ester polymers useful in the process of the present invention are polymers made from esters of acrylic acid, methacrylic acid, or mixturss thereof. Such polymers may optionally include units polymerized from acrylic acid or methacrylic acid; other units may be polymerized from monoethylenically unsaturated monomers copolymerizable with the ester monomers, which do not react with the ester group, anhydride group or secondary amine, or otherwise interfere with the desired formation of anhydride or acid; such copolymerizable monomers are also referred to herein as "inert" monomers.

Operable in the present invention are (meth)acrylic esters containing from one to about 22 carbon atoms in the alcohol group of the ester, including linear, branched and cyclic aliphatic esters, aromatic esters and aralkyl and alkaryl esters. Aryl, halogen or other functionality may be present in the alcohol group of the ester so long as it does not interfere with the reaction of the present process.

Preferred esters include alkyl esters containing from one to about twelve carbon atoms in which the carbon atom joined to the acid group of the ester is a primry or secondary carbon atom; if it is a secondary carbon atom, then in the preferred embodiment neither alkyl group joined to it may exceed five carbon atoms. In structural representation the esters from which the useful polymers may be made have the formula

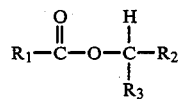

wherein $R_1$ is $CH_2=CH-$ or $CH_2=C-$,
$\underset{CH_3}{|}$ and $R_2$ and $R_3$ are independently selected from among H, alkyl, cycloalkyl, aryl, alkaryl and aralkyl groups, the total of carbon atoms in $R_2$ and $R_3$ being from 0 to 21.

Preferred are those esters in which $R_2$ is H or an alkyl group containing 1 to 11 carbon atoms and $R_3$ is H, or where $R_2$ contains from 1 to 5 carbon atoms, $R_3$ is independently selected and contains 1 to 5 carbon atoms.

More preferred, for reasons of cost, ease of reaction and removal of undesired reaction products, and minimizing polymer weight loss because of the reaction stoichiometry, are esters in which the alcohol group contains one to five carbon atoms, and especially preferred are those esters in which the alcohol group contains one or two carbon atoms, that is, the methyl or ethyl ester.

The copolymers of glutaric anhydride and (meth)acrylic esters prepared by the process of the present invention contain glutaric anhydride units of the structure

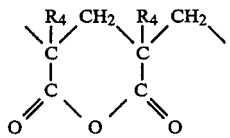

optionally interspersed with pendant ester groups of the structure

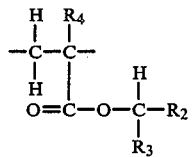

where $R_2$ and $R_3$ are as described above and $R_4$ is H or —$CH_3$, and further optionally interspersed with units of the copolymerizable inert monomers described above.

The reaction conditions for the process of the present invention will depend in part upon the particular esters used. Thus, as certain esters will react much more slowly under a given set of reaction conditions than certain other esters, one ester may be reacted preferentially over another in an ester copolymer.

In general, the anhydride forms more rapidly with primary than with secondary alkyl esters, and more rapidly with esters having smaller than larger alkyl groups, so that practical considerations of reaction time and conditions tend to dictate the upper limits on alkyl-group size and branching. As used herein, the term "polymer" refers to both homopolymers of single esters and copolymers of one or more esters with one or more inert monomers.

Although both acrylic and methacrylic esters are useful in the process of the present invention, preferred are esters of methacrylic acid. Especially preferred esters are methyl methacrylate and ethyl methacrylate.

As used herein, the term "(meth)acrylic ester" shall refer to esters of either acrylic acid or of methacrylic acid. That is, the term includes the above-described esters wherein $R_1$ is $CH_2=CH-$ or $CH_2=C(CH_3)-$.

Polymerization of (meth)acrylic esters such as those described above is well known to those skilled in the art. The ester to be polymerized may be a single pure ester, a mixture of esters as described above, or a single ester or ester mixture further mixed with one or more inert monomers. Preferred inert monomers are styrenic monomers, particularly styrene and alpha-methylstyrene, and olefinic monomers such as ethylene, propylene and butadiene, but other monomers which meet the criteria for inert monomers set forth above, including other alpha-beta unsaturated monomers, may be used. Units from inert comonomers may be randomly distributed with the polymer, or units may be present in block segments such as in block copolymers of ethylene, propylene, ethylene-propylene, or ethylene-propylene-diene which are grafted to (meth)acrylic ester block copolymers.

The secondary amine useful in the process of the present invention is a dialkylamine, diarylamine or alkylarylamine. The preferred amine is easily determined by one skilled in the art according to the specific manner in which the reaction is conducted. For example, in the embodiment of the present invention that uses a solution process at atmospheric pressure, a high-boiling-temperature amine such as diphenylamine is preferred. In the embodiment in which the reaction is conducted at elevated pressure, an amine of higher volatility may be appropriate. Di-substituted or tri-substituted by-product amines may be removed by washing, extraction, devolatilization, or other techniques known to those skilled in the art. In the embodiment in which unreacted amine and byproducts are removed by devolatilization after the reaction, a secondary amine with greater volatility is preferred; particularly preferred are dimethylamine or diethylamine.

The reaction may be conducted in many different types of processing equipment. In an embodiment of the present invention in which a solution reaction is carried out at atmospheric pressure, a simple heated and agitated vessel may be sufficient. The solvent is preferably inert, that is, it does not react with the ester group, anhydride group or secondary amine, or otherwise interfere with the desired formation of anhydride or acid; alternatively it may be reactive, and may comprise the secondary amine itself. The product may then be isolated in any appropriate manner, as for example, precipitation, followed by washing by water, organic liquids, and/or dilute acid, and drying to remove residual volatile materials. If a sufficiently volatile amine has been used, the polymeric product may be recovered by vacuum stripping the reaction mixtures, either in the primary reaction vessel or a secondary vessel or devolatilizing extruder, or any other thermoplastic processing equipment capable of use for devolatilization, such as a wipe film evaporator or disk extruder, and the like. A continuous solution reaction may be conducted using one or more reaction vessels in series, with subsequent isolation by, for instance, a devolatilizing extruder.

In another embodiment the reaction may be conducted in almost any reactor vessel which is capable of withstanding both evacuation to pressures substantially below atmospheric and pressurization to two or more atmospheres absolute. Alternatively, it may be run in two reactors where the first reactor can be run at atmospheric pressure at as low as approximately 150° C. reaction temperature if a solvent or excess amine (used as solvent) is employed, followed by a second step or reactor where excess solvent or amine is removed under elevated temperature and/or reduced pressure. As an example, the first vessel might be a stirred tank reactor and the second a devolatilizing extruder.

Although the reaction may be conducted in almost any reactor vessel or series of reactor vessels, it is especially well suited to a continuous process in a devolatilizing extruder. Using such equipment the polymer may be fed into the extruder and softened, the secondary amine may be injected into the polymer melt, the reaction time may be adjusted by varying the rate at which the polymer passes through the extruder, and the volatile reaction products and excess amine may be removed at the devolatilization port of the extruder.

Variations of polymer handling prior to its reaction with the secondary amine are within the scope contemplated by the present invention. For example, the monomer mixtures may be polymerized directly in the reaction vessel immediately prior to the amine reaction, or it may be continuously polymerized in suitable equipment and fed directly into the reaction zone of the extruder. In each of the above cases suitable monomer or solvent devolatilization may be necessary prior to reaction with amine. Polymer may be fed into the extruder in its solid or melted state, and one or more polymers may be blended together in the extruder prior or subsequent to the amine reaction. These blends may contain rubbery polymers, elastomers, filler, reinforcer, pigments, ultraviolet and antioxidant stabilizers and the like.

As the anhydride-containing polymer is reactive, blending of a polymer or other material intended to react with the anhydride groups is contemplated at any time prior to, or subsequent to, the amine reaction, as long as the material does not adversely affect the reaction. If the reaction is conducted in a polymer melt, the acrylic ester polymer is preferably heated to or above its melting temperature to facilitate its reaction with the amine, but to avoid unnecessary thermal degradation causing color or other undesirable properties, the polymer temperature should be maintained no higher than about 400° C., and preferably for no more than 10 minutes at such a high temperature. In cases where sufficient amine is used, a polymer solution or syrup may be formed, and therefore lower temperatures may be used.

The time that the heated polymers should contact the amine prior to devolatilization should be sufficient to permit the desired degree of anhydride formation; a typical range of times that the amine is in contact with the polymer melt is from about 30 to about 600 seconds at a temperature of from about 200 to about 400° C. for the reaction of methyl methacrylate with dimethylamine. Appropriate adjustments for slower reacting materials, as discussed above, may readily be made where necessary by one skilled in the art.

Pressure during the reaction is generally limited by the pressure capability of the equipment being used, but is typically from about 200 to about 14,000 kPa for the methyl methacrylate-dimethylamine reaction in a devolatilizing extruder, and may reasonably be extended from about 100 to about 100,000 kPa using suitable equipment. The devolatilization step requires temperatures from about 160 to about 400° C. and pressures from about 130 to about 26,600 Pascals; less volatile amines may require higher temperatures, stronger vacuum or longer residence times, or combinations of these.

While not wishing to be bound by the following theoretical discussion, I offer it as an aid to understanding the reaction which is thought to occur during the process of the present invention.

Within the reaction zone of the extruder (or within another type of reaction vessel at the reaction temperature and pressure) the secondary amine is thought to cleave the alkyl-to-oxygen bond of an ester to form the acid group and a tertiary amine, as illustrated by the following reaction of poly(methyl methacrylate) with dimethylamine:

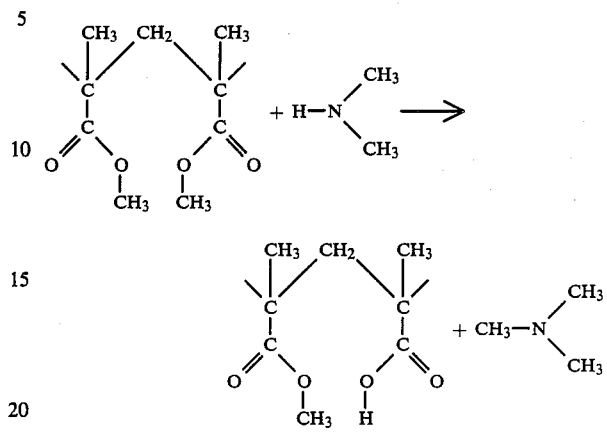

The resulting acid then reacts with an adjacent ester group to form the anhydride and methanol, or additional dimethylamine may form a diacid which can eliminate water to form the anhydride:

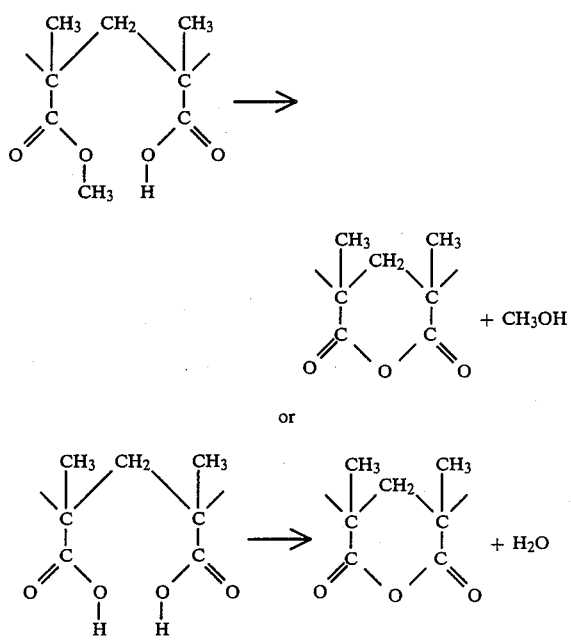

The tertiary amine, alcohol and residual secondary amine are removed as volatiles in the devolatilization step.

According to the above reactions, an anhydride may form by the reaction of any adjacent pair of ester groups. The reaction proceeds without impediment in pure acrylic ester polymers, but it is expected that polymers copolymerized from acrylic esters highly diluted with inert monomers would contain a relatively large number of individual ester groups without an adjacent ester group. In such a case it is expected that a significant level of available, pendant acid groups may develop in the polymer.

As levels of inert comonomer are increased in the polymer used in the present process, the product will contain increasing levels of acid if the inert comonomer is randomly distributed.

Also, at high degrees of reaction, where most of the initial acrylic diads are already converted to anhydride, some ester groups may become trapped between cyclic groups, leading to free acid functionality in the polymer. This mechanism creates a statistical limit on the degree of anhydride formation, the "Flory limit", of about 86 mole percent. Potential reaction pathways exist, however, in which dynamic ring openings and closings could eliminate some of these trapped ester groups, so the degree of reaction may actually exceed the Flory limit.

In view of the above discussion, the polymer to be reacted in the process of the present invention will preferably contain from about 100% to about 20%, based on the weight of the total monomer mixture, of acrylic ester.

An exception to this is a block copolymer of (meth)acrylic ester and inert polymer units. In this case, low levels of (meth)acrylic ester may still lead to high conversion to anhydride, if the (meth)acrylic ester portion consists of significant blocks or "runs" of adjacent acrylic groups. In general, this invention may be used with any block or graft copolymer where a sequence of acrylic units occurs and the sequence is equal to or greater than two. For purposes of illustration, a block copolymer of A-B-A type, where A is acrylic and B is inert comonomer, such as butadiene, might be used in this invention to incorporate anhydride functionality into the acrylic sequences of the block copolymer.

It is also clear from the above discussion that, with copolymers of acrylic ester and inert comonomers at low levels of acrylic ester, the process of this invention is capable of producing copolymers of largely free acid and inert comonomer, with only small amounts of anhydride.

The polymers produced by the process of the present invention are soluble, non-crosslinked, and have high thermal-decomposition temperatures; the temperature at which one percent weight loss occurs during thermogravimetic analysis is at least approximately 100° C. above the glass transistion temperature. These polymers also have advantageously high glass transition temperatures, generally above 130° C., and possess good mechanical strength and optical properties, hydrocarbon solvent resistance, oil resistance, high flexural and tensile modulus, good hardness and scratch resistance, high thermal stability, good metal adhesion, low gas permeability, and the ability to react with many nucleophilic groups to graft to other polymers. These properties enable this material to have utility in the following applications: heat-resistant and solvent-resistant engineering thermoplastics, optical fibers, optical recording media, medical devices, gas barrier films, photoresist materials, and electrical insulators. The polarity and reactivity of the anhydride group can be used to provide a polymeric carrier for slow-release drug, herbicide, fungicide, and insecticide systems, potting agents in an epoxy/anhydride crosslinked system, and as melt-strength improvers for nylon and polyesters, and their blends. For instance, a blend of nylon, polyethylene terephthalate, or polybutylene terephthalate and methyl methacrylate/dimethylglutaric anhydride copolymer can be used to make the base polymer more impact modifiable toward acrylic, MBS and ABS impact modifiers. The acrylic ester/anhydride copolymers may also be used with polyesters and/or polyamides to make the latter more compatible with other polymer blends such as styrene-acrylonitrile (SAN), ABS, poly(methyl methacrylate), PVC, and the like.

The acrylic ester/anhydride copolymers may also be used in a variety of formulations with additives, while maintaining a significant degree of their original properties. Thus, these polymers may be modified with impact modifiers, foaming agents, glass fillers, inorganic fillers, dyes, pigments, flame retardants, antistatic agents, thermal and ultraviolet stabilizers, mold release agents, and the like.

The polymers produced by the process of this invention may be processed into sheet, film, rod, profile, or complex parts by any known plastics processing technique, and can be painted, dyed, decorated, metallized, or coated with abrasion resistant coatings.

In addition, these materials may be swelled with a number of crosslinking agents such as diamines, dialcohols, diisccyanates, diepoxides, and the like, and heated to form crosslinked materials.

The following examples are intended to illustrate the present invention, and not to limit it, except as it is limited in the claims. All proportions and percentages are by weight, unless otherwise indicated, and all reagents used are of good commercial quality unless otherwise indicated.

EXAMPLE 1

A granular polymer of essentially pure poly(methyl methacrylate) was added at a rate of 30.0 g/min. to the feed zone of a 2-cm-diameter, counter-rotating, tangential, twin-screw extruder operating at 250 rpm. The polymer was conveyed through a feed zone 10.2 diameters long, operated at a set temperature of 200° C., and over a melt blister 3 cm long into a pressurized reaction zone 36.9 diameters long, operated at a set temperature of 302° C., into which dimethylamine was introduced by pumping at a rate of 5.2 cm$^3$/min. (3.3 g/min.) at 2515 kPa, at a point 5.7 diameters downstream from the end of the melt blister. The excess amine and gaseous by-products were removed through a pressure-regulated valve set to 2515 kPa at a point 27.0 diameters downstream from the end of the melt blister. The polymer melt was then conveyed over a second melt blister 10.7 cm long and into a 21.9 diameters-long devolatilizing zone at 288–302° C. and 8.5 kPa pressure. The screw in this zone consisted of a single lead, and the vacuum vent was positioned at a point 10.0 diameters downstream from the end of the melt seal. The polymer that exited the extruder from a melt die was briefly cooled in a water bath, and was stranded, pelletized, and collected.

The product polymer had a Vicat softening temperature of 136.0° C. and was analyzed for nitrogen by a micro Kjeldahl procedure. The presence and amount of polymer units of methyl methacrylate (MMA), anhydride, methacrylic acid (MAA), and N,N' dimethyl methacrylamide were determined by Fourier-transform infra-red analysis (FTIR) and carbon-13 nuclear magnetic resonance analysis (NMR). The processing conditions are shown in Table 1 and the analytical results in Table 2 (both mole % and weight %). All mole percentages are based on the percentage of carbonyl groups in the functional group analyzed, divided by the total carbonyl groups, to avoid any confusion caused by the anhydride containing two carbonyl groups. In this manner, the total number of moles derived from the acrylic starting material does not change with the degree of conversion to anhydride.

In this and all other examples, the Vicat softening point was determined by ASTM DI 525-70 and reported in degrees Celsius; this temperature is generally about 6° C. degrees higher than the polymer glass transition temperature. The total titratable acidic functionality in the polyanhydrides was determined by titration of a 0.04-0.10 g sample of polymer dissolved in 75 ml dimethyl sulfoxide (DMSO) with 50 ml water. The sample weight was adjusted to give about 0.5 mmole titer. To this stirred solution, an excess of 0.1 N NaOH was added (approximately 0.9-1.0 mmole, total) at a rate of 1.0 ml/min. at room temperature. This solution was then back-titrated with 0.1 N HCl after adding phenolphthaline indicator. The total acid level was taken as the difference between the millimoles of sodium hydroxide added and the millimoles of hydrochloride acid required to neutralize the excess hydroxide, per gram of sample. A second value was calculated from the millimoles of hydrochloride acid required to titrate from the first potentiometric transition ($OH^- \rightarrow H_2O$) to the second transition ($COO^- \rightarrow COOH$). These two titers were always within 7% of each other. Titration end points were determined colorimetrically and potentiometrically, and were performed on a Metrohm Herisaw Potentiograph E536 with a Fisher Scientific pH probe (No. 1363990), or an automatic Metrohm Titroprocessor 636 instrument.

Fourier-transform infra-red spectra were obtained on cast films (on KBr) or in solution (DMSO) on a Digilab FTS-15/90 FTIR instrument.

Carbon 13 spectra were run on a Varian XL-400 (400 MHz) instrument in d5 pyridine at 24° C., using a 15 second pulse delay for quantitative analysis purposes.

The polymer produced in Example 1 was titrated as previously described, and showed 3.57±0.07 mmol/g of titratable acidic functionality. Under these titration conditions all anhydride is hydrolyzed to carboxylate and back titrated to carboxylic acid. Both NMR and FTIR analyses show about 27% by weight of acidic functionality, which is almost entirely in the anhydride form. These measurements predict 3.53 and 3.48 mmol/g acidity, which agrees well with the measured titration value of 3.57±0.07 mmol/g.

EXAMPLES 2-6

In a similar manner, polymers of Examples 2-6 were prepared by holding the feed polymer conditions essentially constant and varying only the amount and pressure of the dimethylamine introduced. Table 2 shows the compositional analysis of the polymers of these examples, which also show good agreement between the FTIR, nitrogen (amide) content and titration data. The FTIR analysis could detect at least about 1% of a component.

Examples 1-6 show that the reaction of dimethylamine with poly(methylmethacrylate) is facile, results in few side-products (MAA or amide) up to about 70 mole percent conversion, and requires about 1:1 dimethylamine:MMA stoichiometry. As conversion approaches approximately 86 mole percent, more acid (MAA) is seen, and finally at high levels of excess amine and pressures, a significant amount of N,N'-dimethyl methacrylamide is seen (Example 6). Other polymers made at DMA/MMA ratios of 0.25-0.83 and DMA pressures of up to 4240 kPa did not produce any significant differences in anhydride or amide levels.

While not wishing to be bound by the following speculation on reaction mechanism, I offer it as a further aid to understanding the reactions which may occur during the process of the present invention.

The slowing of the reaction at about 86% conversion is consistent with random initial MAA formation, and the 1:1 stoichiometry indicates that the predominate reaction pathway probably involves two alkylations per anhydride. Amide groups may form from the reaction of isolated ester and/or acid groups via a normally less competitive pathway. Other possibilities include equilibrium reactions where higher amine pressures would shift the equilibrium from, for instance, anhydride and amine to an amide-acid pair.

The above discussion is meant to be illustrative only, as multiple reaction pathways might occur. Practice of the anhydride-forming process of this invention does not require a knowledge of detailed mechanisms.

Table 3 shows that all polymeric anhydrides have high thermal decomposition temperatures, well above their glass transition temperatures (Tg); the Tg valves are understood to be approximately 6° C. below the measures Vicat softening temperatures. These compositions are therefore stable, processable thermoplastic materials. All thermogravimetric analyses (TGA's) were run at a 20° C./min. programmed heating rate in both and air and nitrogen.

TABLE 1

| Example No. | pMMA Rate[1] (g/m) | Me$_2$NH Rate[2] ml/min./ (g/m) | Me$^2$NH Pressure[3] kPa | Ratio DMA:MMA[4] | Vicat[5] (°C.) | N[6] (%) | mmol/g total acid[7] |
|---|---|---|---|---|---|---|---|
| 1 | 30.0 | 5.20/ 3.35 | 2515 | 0.25 | 136.0 | 0.01 | 3.57 |
| 2 | 30.0 | 10.5/ 6.77 | 2515 | 0.50 | 143.5 | 0.03 | 6.69 |
| 3 | 30.0 | 17.3/ 11.2 | 2515 | 0.83 | 155.3 | 0.10 | 9.92 |
| 4 | 31.0 | 28.5/ 18.4 | 2549 | 1.32 | 158.9 | 0.19 | 11.25 |
| 5 | 31.0 | 40.0/ 25.8 | 2480 | 1.85 | 158.8 | 0.18 | 10.96 |
| 6 | 31.0 | 40.0/ | 3858 | 1.85 | 166.2 | 0.95 | 11.00 |

TABLE 1-continued

| Example No. | pMMA Rate[1] (g/m) | Me$_2$NH Rate[2] ml/min./ (g/m) | Me$_2$NH Pressure[3] kPa | Ratio DMA:MMA[4] | Vicat[5] (°C.) | N[6] (%) | mmol/g total acid[7] |
|---|---|---|---|---|---|---|---|
| | | 25.8 | | | | | |

[1]Type of feed is 200,000 Mw poly(methyl methacrylate) (pMMA) at indicated grams/minute.
[2]Dimethylamine (density about 0.645 g/ml) is pumped into the extruder under pressure.
[3]The pressure measured is the reaction-zone dimethylamine pressure.
[4]The molar ratio of dimethylamine to MA units.
[5]Vicat softening point temperature in degrees Celsius (ASTM DI 525-70).
[6]Weight percent nitrogen as determined from micro Kjeldahl analysis.
[7]The acid in the product polymer in millimoles per g of sample (titration in DMSO/H$_2$O//75/50).

TABLE 2

| Example No. | Test Type | Mole % Composition[1] | | | | Weight % Composition | | | | mmol/g total acid[2] (pred./meas.) |
|---|---|---|---|---|---|---|---|---|---|---|
| | | MMA | ANH | MAA | AMIDE | MMA | ANH | MAA | AMIDE | |
| 1 | FTIR: | 72.8 | 27.2 | n.d. | n.d. | 67.3 | 32.7 | n.d. | n.d. | 3.53 |
| | 13 CNMR: | 73.2 | 26.1 | 0.7 | n.d. | 67.8 | 31.4 | 0.8 | n.d. | 3.48 |
| | % N: | | | | 0.1 | | | | 0.1 | |
| | Titr.: | | | | | | | | | (3.57 ± .07) |
| 2 | FTIR: | 43.3 | 56.7 | n.d. | n.d. | 49.8 | 50.2 | n.d. | n.d. | 6.51 |
| | % N: | | | | 0.2 | | | | 0.2 | |
| | Titr.: | | | | | | | | | (6.69 ± .17) |
| 3 | FTIR: | 19.4 | 75.1 | 4.7 | n.d. | 23.6 | 70.4 | 4.9 | n.d. | 9.70 |
| | % N: | | | | 0.6 | | | | 0.8 | |
| | Titr.: | | | | | | | | | (9.92 ± .22) |
| 4 | FTIR: | 6.1 | 87.3 | 5.8 | tr. | 7.7 | 84.9 | 6.3 | tr. | 11.7 |
| | % N: | | | | 1.1 | | | | 1.5 | |
| | Titr.: | | | | | | | | | (11.3 ± .40) |
| 6 | FTIR: | 1.9 | 77.7 | 12.5 | 7.9 | 2.3 | 73.5 | 13.2 | 11.0 | 11.1 |
| | % N: | | | | 5.5 | | | | 7.7 | |
| | Titr.: | | | | | | | | | (11.0 ± .31) |

[1]Mole % compositions all based on carbonyl groups (i.e., anhydride composition not corrected for 2 carbonyls per group). ANH = methacrylic anhydride, MAA = Methacrylic acid, AMIDE = N,N'—dimethylmethacrylamide, MMA = methyl methacrylate. N.D. = not detected, tr. = trace. Weight percent amide = 100 (% N/12.38%).
[2]The predicted acid in the product polymer, in millimoles per gram of sample, calculated from the millimoles of MAA + anhydride; parenthetical values are measured titrations in DMSO/H$_2$O 75/50).

TABLE 3

| Example Number | TGA Temperature (degrees C.) | | | |
|---|---|---|---|---|
| | In Air | | In Nitrogen | |
| | 1% Wt. Loss | 10% Wt. Loss | 1% Wt. Loss | 10% Wt. Loss |
| 1 | 349 | 391 | 386 | 424 |
| 2 | 352 | 401 | 385 | 435 |
| 3 | 378 | 422 | 407 | 443 |
| 4 | 312 | 424 | 308 | 441 |
| 6 | 369 | 428 | 386 | 445 |

EXAMPLE 7

A pelletized terpolymer of methyl methacrylate/alpha-methylstyrene/ethyl acrylate (approximately 3:1 : 0.1 mole ratio) was reacted with dihexylamine by adding 25 g terpolymer, 34.3 g dihexylamine and 35 g biphenyl to a 500 ml, 3-neck, round-bottom flask equipped with a mechanical stirrer and a reflux condenser. The mixture was heated to 196°-198° C. and held at that temperature for 25 hours under a nitrogen sparge.

After the resulting dark yellow solution was cooled to 45° C., 50 ml of tetrahydrofuran was charged to the reaction flask. The polymer product was isolated by precipitating it from deionized water as a yellow powder. FTIR analysis of the product, cast as a film onto KBr from DMSO solution, showed 52% anhydride, 31% MAA, 17% N,N'-dihexyl methacrylamide (based on peak area/total peak area) and an unchanged alpha-methylstyrene component. The nitrogen analysis of this sample shows 1.95% N, which agrees well with the calculated nitrogen content based on the IR data (calculated nitrogen content =1.83%). The IR analysis of films cast from DMSO and THF shows, in addition to the amide peak at 1665 cm$^{-1}$, either a broad MAA peak at 1716 cm$^{-1}$ (cast from DMSO) or two MAA peaks at 1700 and 1725 cm$^{-1}$ (from THF) indicating possible hydrogen bonding effects on an amine-acid salt. A broad peak at 2500 cm$^{-1}$ also indicates MAA hydrogen bonding or acid salt effects. The 13C NMR spectrum in DMSO-d6 shows that essentially no MMA (less than 5%) was left in the reaction product, and confirms that N,N'-dihexyl methacrylamide, indicated by the FTIR analysis, is present in the polymer.

EXAMPLE 8

A pelletized terpolymer of MMA/alphamethylstyrene/EA in the ratio of about 3 : 1 : 0.1 was reacted with diphenylamine by adding 25 g of the terpolymer and 35.0 g of diphenylamine to a 500 ml, 3-neck, round bottom flask equipped with a mechanical stirrer and a reflux condenser. The mixture was heated at 210° C. over 48 hours under a nitrogen sparge.

After the resulting gold-brown solution was cooled to 55° C., 50 ml of tetrahydrofuran was charged to the reaction vessel. The polymer product was isolated via precipitation from methanol as a tan powder. FTIR analysis of the product, cast as a film onto KBr from DMSO solution, showed 70% anhydride, 5% MAA, 25% MMA (based on peak area/total peak area), no N,N'-diphenyl methacrylamide and an unchanged alpha-methylstyrene component. The nitrogen analysis of this sample showed 0.38% nitrogen, indicating that the MAA component of the product (IR=1730 cm$^{-1}$) may be primarily in the MAA-diphenylammonium salt form (calculated nitrogen assuming all MAA in amine-salt form, was 0.54% by weight). The 1H NMR analysis confirmed the presence of MAA and the lack of amide.

We claim:

1. A process for preparing thermoplastic copolymers of glutaric anhydride and (meth)acrylic ester, which process comprises reacting
   (a) a (meth)acrylic ester polymer polymerized from monomers having the formula

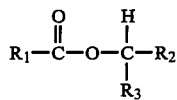

wherein $R_1$ is $CH_2=CH-$ or $CH_2=C-$,
$\qquad\qquad\qquad\qquad\qquad\qquad\quad |$
$\qquad\qquad\qquad\qquad\qquad\qquad\ CH_3$ and $R_2$ and $R_3$ are independently selected from among H, alkyl, cycloalkyl, aryl, alkaryl and aralkyl groups, the total of carbon atoms in $R_2$ and $R_3$ being from 0 to 21, with
   (b) a secondary amine selected from among dialkylamines, diarylamines and alkylarylamines, at a temperature of from about 150° to about 400° C., and subsequently isolating the polymer product.

2. The process of claim 1 wherein the secondary amine is sufficiently volatile to be removed at temperatures above about 160° C. and pressures below about 26.6 kPa, and the polymer product is isolated by removing volatile component from the polymer at a temperature of from about 160° C. to about 400° C. and a pressure below about 26.6 kPa.

3. The process of claim 1 wherein $R_2$ is H or a $C_1$–$C_{12}$ alkyl group and $R_3$ is H.

4. The process of claim 1 wherein $R_2$ is $C_1$–$C_5$ alkyl group and $R_3$ is an independently selected $C_1$–$C_5$ alkyl group.

5. The process of claim 1 wherein $R_2$ and $R_3$ are H or independently selected alkyl groups, and the total of carbon atoms in $R_2$ and $R_3$ is from 0 to 4.

6. The process of claim 5 wherein $R_2$ and $R_3$ are H.

7. The process of claim 5 wherein $R_2$ is -$CH_3$ and $R_3$ is H.

8. The process of claim 1 wherein (a) is a methyl methacrylate polymer.

9. The process of claim 1 wherein (a) is an ethyl methacrylate polymer.

10. The process of claim 1 wherein (a) is an ethyl acrylate polymer.

11. The process of claim 1 wherein (a) is a methyl acrylate polymer.

12. The process of claim 1 wherein the secondary amine is selected from dimethylamine and diethylamine.

13. The process of claim 3 or 4 wherein the secondary amine is dimethylamine.

14. The process of claim 3 or 4 wherein the secondary amine is diethylamine.

15. The process of claim 1 wherein the (meth)acrylic ester polymer is reacted at atmospheric pressure with the secondary amine in a mutual solvent for the polymer and the amine.

16. The process of claim 15 wherein the copolymer is isolated, subsequent to the reaction, by precipitating it from solution, washing and drying it.

17. The process of claim 12 wherein the copolymer is isolated by vacuum stripping residual amine from the reaction mixture.

18. The process of claim 17 wherein the reaction and vacuum stripping occur in a devolatilizing extruder.

19. The process of claim 1 wherein (a) and (b) are reacted at a temperature of from about 200° to about 400° C. for a time of from about 30 to about 600 seconds.

* * * * *